United States Patent
Guillaume et al.

(10) Patent No.: US 8,308,369 B2
(45) Date of Patent: Nov. 13, 2012

(54) ROLLER BEARING WITH DIFFERENTIAL RIGIDITY IN THE INSTRUMENTED AREAS IN DEFORMATION

(75) Inventors: Sebastien Guillaume, Menthon-Saint-Bernard (FR); Cyril Pourreuix, Annecy (FR)

(73) Assignee: SNR Roulements, Annecy (FR)

( * ) Notice: Subject to any disclaimer, the term of this patent is extended or adjusted under 35 U.S.C. 154(b) by 745 days.

(21) Appl. No.: 12/369,764

(22) Filed: Feb. 12, 2009

(65) Prior Publication Data

US 2009/0208158 A1 Aug. 20, 2009

(30) Foreign Application Priority Data

Feb. 14, 2008 (FR) ...................... 08 00825

(51) Int. Cl.
- *F16C 32/00* (2006.01)
- *F16C 33/58* (2006.01)
- *F16C 43/04* (2006.01)
- *F16C 13/00* (2006.01)
- *G01L 3/14* (2006.01)

(52) U.S. Cl. ........ 384/448; 384/515; 384/585; 384/589; 73/862.322

(58) Field of Classification Search .................. 384/448, 384/513, 515, 544, 569, 584, 585, 589; 73/862.322; 301/6.1, 6.2, 105.1, 124.18

See application file for complete search history.

(56) References Cited

U.S. PATENT DOCUMENTS

| | | | | |
|---|---|---|---|---|
| 5,328,275 | A * | 7/1994 | Winn et al. ................... | 384/472 |
| 7,044,563 | B2 * | 5/2006 | Suzuki ....................... | 301/105.1 |
| 7,111,911 | B2 * | 9/2006 | Baumgartner et al. .... | 301/105.1 |
| 7,393,064 | B2 * | 7/2008 | Hall et al. .................. | 301/105.1 |
| 7,631,553 | B2 * | 12/2009 | Heim et al. ................ | 73/115.07 |
| 7,650,802 | B2 * | 1/2010 | Duret et al. ............. | 73/862.322 |
| 7,762,128 | B2 * | 7/2010 | Ozaki et al. ............... | 73/117.01 |
| 2003/0185476 | A1 | 10/2003 | Nakamura et al. | |
| 2007/0177836 | A1 * | 8/2007 | Niebling et al. ............ | 384/544 |
| 2009/0097791 | A1 * | 4/2009 | Ozaki et al. ................ | 384/448 |
| 2009/0214146 | A1 * | 8/2009 | Ehinger et al. .............. | 384/448 |
| 2009/0252444 | A1 * | 10/2009 | Duret et al. ................. | 384/448 |

FOREIGN PATENT DOCUMENTS

| | | |
|---|---|---|
| EP | 1176409 A1 | 1/2002 |
| EP | 1672371 A1 | 6/2006 |
| EP | 1843055 A1 | 10/2007 |

OTHER PUBLICATIONS

International Search Report dated Oct. 13, 2008.

* cited by examiner

*Primary Examiner* — Thomas R Hannon
*Assistant Examiner* — Adam D Rogers
(74) *Attorney, Agent, or Firm* — Bachman & LaPointe, P.C.

(57) ABSTRACT

A roller bearing includes a stationary member, a rotary member and at least one row of rolling bodies arranged between the members so as to enable their relative rotation. The stationary member includes a circumferential surface that is resiliently deformable by the forces induced by the passage of the rolling bodies when the rotary member rotates. The surface has at least one instrumented area on which at least one gauge for measuring the deformations is attached. The instrumented area is circumferentially surrounded on each side by a non-instrumented area, and the rigidity of the instrumented area is strictly greater than the rigidity of the non-instrumented areas.

7 Claims, 2 Drawing Sheets

ROLLER BEARING WITH DIFFERENTIAL RIGIDITY IN THE INSTRUMENTED AREAS IN DEFORMATION

BACKGROUND (1) Field of the Invention

The invention relates to a roller bearing including a stationary member, a rotating member and at least one row of rolling bodies arranged between said members so as to enable their relative rotation.

In particular, the invention applies to motor vehicle wheel bearings, in which the stationary ring of said bearing is intended to be secured to the chassis of the vehicle, and in which the wheel is intended to be rotatably mounted by means of the rotary ring of said bearing, and two rows of balls are provided between said rings.

(2) Prior Art

In numerous applications, in particular in support and safety systems such as ABS or ESP, it is necessary to determine the forces that are applied during movements of the vehicle at the interface between the wheel and the road on which said wheel is turning.

In particular, the determination of these forces can be performed by a measurement of the deformations of the stationary ring, which are induced by the passage of rolling bodies. Indeed, the amplitude of these deformations is representative of the forces transmitted by the bearing. To do this, in particular document EP-1 176 409 suggests instrumenting stationary ring areas by attaching at least one gauge to them for measuring said deformations.

However, the measurement of the deformations thus performed remains difficult to perform, in particular due to the low variation in amplitude with respect to general deformations of the stationary ring, which are induced by factors other than the passage of rolling bodies. In particular, the temperature induces an average deformation of the external ring, and the deformations induced by the passage of rolling bodies vary only slightly around this average value.

SUMMARY OF THE INVENTION

The invention aims to improve the prior art by proposing in particular a roller bearing with which the stationary member is instrumented in deformation, in which said member is arranged to enable an increase in the ratio between the amplitude variations and the deformations induced by the passage of rolling bodies and the average amplitude of deformations of the stationary member.

To this end, the invention proposes a roller bearing including a stationary member, a rotary member and at least one row of rolling bodies arranged between said members so as to enable their relative rotation, in which said stationary member includes a circumferential surface that is resiliently deformable by the forces induced by the passage of the rolling bodies when the rotary member rotates, and in which said surface has at least one instrumented area on which at least one gauge for measuring said deformations is attached, which instrumented area is circumferentially surrounded on each side by a non-instrumented area, and the rigidity of the instrumented area is strictly greater than the rigidity of the non-instrumented areas.

BRIEF DESCRIPTION OF THE DRAWINGS

Other objectives and advantages of the invention will appear in the following description, in reference to the appended figures, in which.

DETAILED DESCRIPTION OF THE PREFERRED EMBODIMENT(S)

Figure 1:
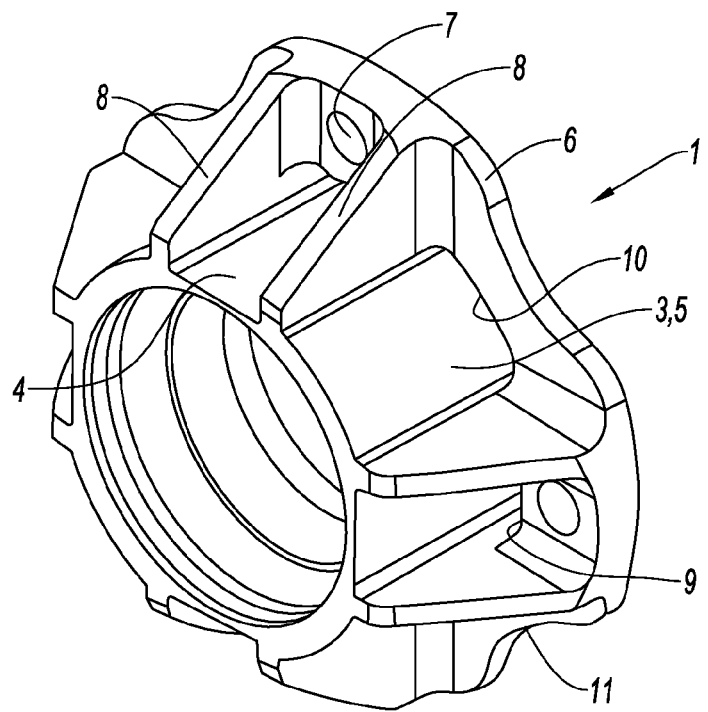
FIG. 1 is a perspective view of a roller bearing according to a first embodiment of the invention.

In relation to these figures, we will describe below a roller bearing of a motor vehicle wheel including a stationary external member 1 intended to be attached to the chassis of the vehicle, an internal rotary member (not shown) to be mounted with the wheel and two rows of balls (not shown), which are arranged in a roller path 2. However, the invention may relate to other types of roller bearing, as well as bearings for other uses in motor vehicles and the like.

When the vehicle moves, the wheel turns on the road, inducing forces at their interface, which forces are transmitted to the chassis by means of the bearing. Consequently, the determination of these forces, in particular with a view to supplying the vehicle support and safety systems, can be performed by temporally estimating the components of the torsor of forces applied on the bearing.

In particular, when the balls pass, the torsor of forces induces deformations of the stationary member 1 of which the measurement can be used to calculate the estimation of the components of said torsor.

To do this, the stationary member 1 has a circumferential surface 3 that can be resiliently deformed by the passage of rolling bodies when the rotary member rotates in the stationary member 1. In the embodiments shown, the circumferential surface 3 is formed on the external periphery of the stationary member, more specifically on the cylindrical rotating portion of said external surface. Indeed, the passage of rolling bodies induces a radial force on this surface 3, which periodically resiliently deforms it around an average value.

The deformable surface 3 has at least one instrumented area 4 on which at least one gauge (not shown) for measuring deformations is attached. According to an embodiment, the gauge can include one or more patterns based on resistive, in particular piezoresistive or magnetoresistive elements, which are arranged on a support substrate, which substrate is attached for example by bonding on said area. To facilitate this attachment, the instrumented area 4 can include a flat portion on which the substrate is attached.

In particular, a gauge including a bar of patterns spaced apart on a substrate can be used to deliver a pseudo-sinusoidal time signal around an average value, which signal is dependent on the deformations of the instrumented area 4. Thus, the signal can be designed so as to use the pseudo-sinusoidal component that is representative of the amplitude of the deformations induced by the passage of rolling bodies. However, the invention is not limited to a specific embodiment of the gauges for measuring the deformations of the external surface 3 of the stationary member 1.

The instrumented area 4 is circumferentially surrounded on each side by a non-instrumented area 5. In the embodiments shown, four instrumented areas 4 are equally distributed over the external surface 3 of the stationary member 1, and said instrumented areas are separated from one another by four non-instrumented areas 5. In particular, the edges of the areas 4, 5 extend axially and the angular dimension of the non-instrumented areas 5 is greater than the angular dimension of the instrumented areas 4, for example by a factor on the order of 2.

In relation to the figures, we will describe below two embodiments of a roller bearing in which the external surface 3 of the stationary member 1 has a flange 6 including four holes 7 forming means for attaching the bearing by bolting to a stationary structure. In particular, the flange 6 extends essentially radially from the vicinity of an edge of the external surface 3, and the instrumented areas 4 extend axially from the flange 6 to the opposite edge of said external surface.

To enable an increase in the ratio between the variations in amplitude of the deformations induced by the passage of rolling bodies and the average amplitude of the deformations of the stationary member 1, the invention stipulates that the rigidity of the instrumented areas 4 be strictly greater than the rigidity of the non-instrumented areas 5. Indeed, the average deformations, in particular of ovalization and expansion of the external surface 3 of the stationary member 1, are then more specifically located on the non-instrumented areas 5 so as to limit them on the instrumented areas 4.

In addition, also to limit the influence of the variations in average deformation in the measurements, the gauges can be attached in the most rigid portion of the instrumented areas 4, for example near the flange 6 in the embodiments shown.

Moreover, to increase the amplitude of the measurements of the deformations induced by the passage of rolling bodies, the measurement gauges can be arranged as close as possible to the roller paths 2. In the embodiments shown, an instrumented area 4 can include a gauge near the radial plane containing a roller path 2, in which said gauges can be borne by the same substrate, which then extends axially from one roller path 2 to the other.

Additionally, according to the embodiments shown, the roller bearing includes structural means for rigidification of the instrumented areas 4 and/or structural means for relaxation of the non-instrumented areas 5. In particular, these rigidification and relaxation means, respectively, can include an added or a reduced amount of material on the stationary member 1, and in particular on the resiliently deformable surface 3. According to an embodiment not shown, the rigidification and/or relaxation can be obtained by modifying the inherent rigidity of the material forming the instrumented 4 and non-instrumented 5 areas, respectively.

Figure 2:
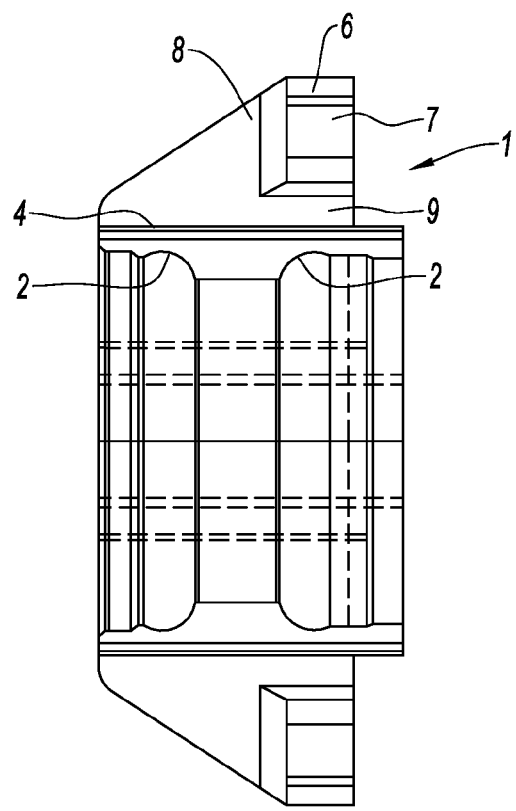
FIG. 2 is a longitudinal cross-section view of the roller bearing according to FIG. 1.

In FIGS. 1 and 2, the structural rigidification means include two axial walls 8 that extend from the flange 6 while being secured to the external surface 3. More specifically, the flange 6 extends radially and the walls 8 are integrated on a lateral surface of said flange while being spaces apart circumferentially. In addition, the axial walls 8 shown extend over the entire axial dimension o the external surface 3, with the radial dimension of the walls 8 decreasing from the flange 6 to the opposite edge of the external surface 3. This embodiment makes it possible to obtain a U structure for rigidification of an instrumented area 4.

In addition, each wall 8 separates the instrumented area 4 from a non-instrumented area 5 so as to angularly delimit said instrumented area between said axial walls. Moreover, the angular dimension of the instrumented area 4 is strictly smaller than the angular dimension of the non-instrumented areas 5 so that the walls 8 essentially rigidify said instrumented area.

In FIGS. 1 and 2, an attachment hole 7 is arranged between the two axial walls 8 in the angular portion delimiting the instrumented area 5, so that the walls 8 also rigidify the portion of the flange 6 on which the attachment forces are primarily concentrated.

In addition, a hole 9 is formed in the junction between the instrumented area 4 and the flange 6. Indeed, the gauge can then be at least partially attached in said hole so as to be arranged as closely as possible to the roller path 2, which is formed under the flange 6.

In addition to the increase in rigidity of the instrumented area 4, the roller bearing can include means for relaxing the non-instrumented areas 5 so as to increase the differential rigidity between said areas 4, 5.

In the two embodiments shown, the means for relaxing a non-instrumented area 5 include a hole 10 in the junction between said area and the flange 6. Thus, by detaching, at least locally over an angular segment, the flange 6 from the non-instrumented area 5, said non-instrumented area is relaxed.

Moreover, in FIGS. 1 and 2, the portion of the flange 6 formed opposite the non-instrumented area 5 is also relaxed. Indeed, this portion has a general height that is lower than that of the portion of said flange formed opposite the instrumented area 4, so as to increase the differential rigidity between said areas 4, 5. In particular, the portion of the flange 6 formed opposite the non-instrumented area 5 has an indentation 11 between the two axial walls 8.

In addition, again to relax the non-instrumented area 5, the thickness of the portion of the flange 6 formed opposite said area can be reduced. In an alternative not shown, the hole 9 can extend over the entire height of the flange 6 so as to form a discontinuity in said flange.

Figure 3:
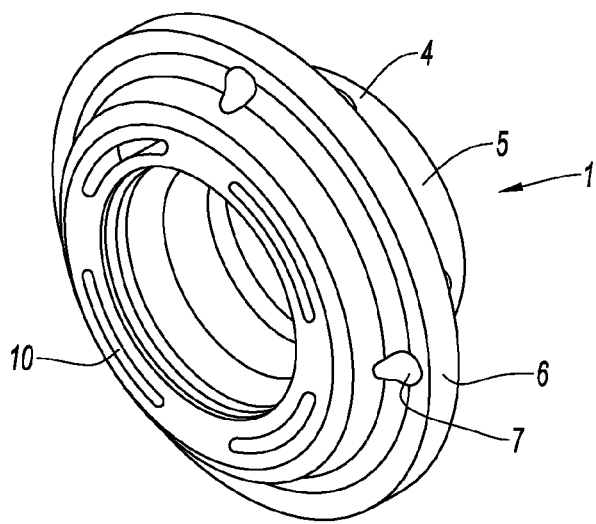
FIGS. 3 and 4 are perspective views of a roller bearing according to a second embodiment of the invention.
Figure 4:
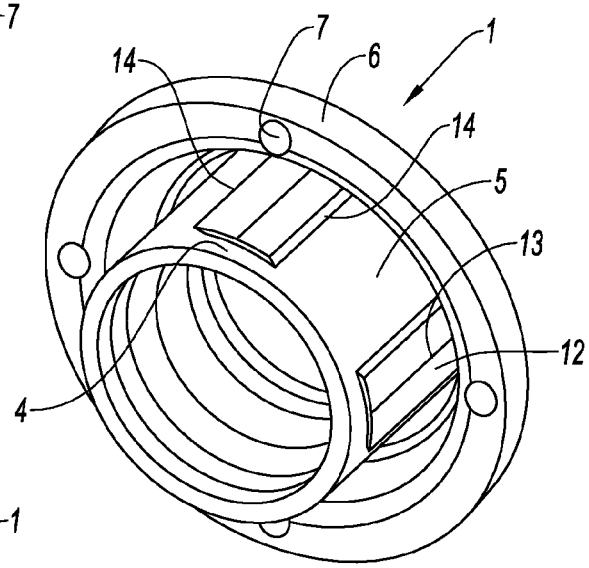
Figure 5:
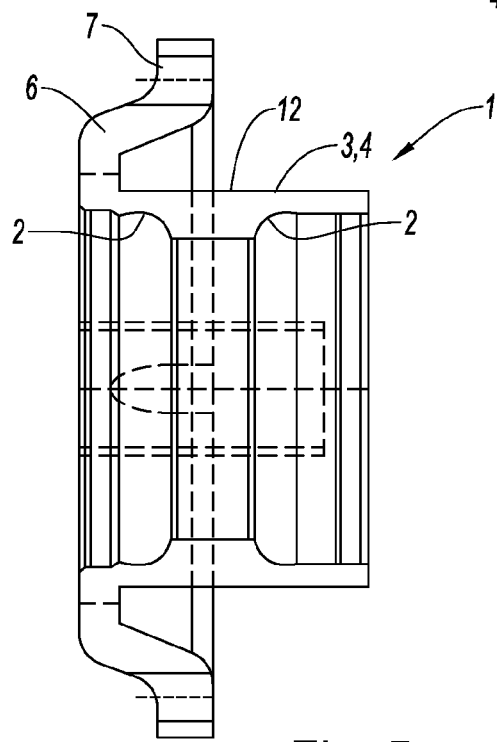
FIG. 5 is a longitudinal cross-section view of the roller bearing according to FIGS. 3 and 4.

In FIGS. 3 to 5, the structural rigidification means include a boss 12 that is produced on the instrumentation area 4, with the measurement gauge being attached to said boss. According to the invention, this direct rigidification of the instrumented area 4 can be combined with the indirect rigidification of said area by providing the axial rigidification walls 8 previously described.

The bosses 12 have a flat portion for attachment of the gauges, in which said flat portion is produced so that the diameter of its central portion 13 is substantially equal to that of the external surface 3 of the stationary member 1, and the lateral edges 14 of said flat portion project radially with respect to said surface. Thus, by arranging the gauge on this central portion 13, the arrangement of the gauge as close as possible to the roller paths 2 is combined with the rigidification induced by the addition of material on each side of said gauge.

The invention claimed is:

1. A roller bearing includes a stationary member, said stationary member including a circumferential surface that is resiliently deformable, said circumferential surface having an instrumented area, said instrumented area having opposed sides and being circumferentially surrounded on each side by a non-instrumented area, said roller bearing having a rigidity of the instrumented area which is greater than a rigidity of the non-instrumented areas, said roller bearing further comprising at least one of means for structural rigidification of the instrumented area and means for structural relaxing said non-instrumented areas, the circumferential surface being formed on an external surface of the stationary member, the external surface of the stationary member having a flange including attaching means, the at least one means for structural rigidification include two axial walls that extend from the flange while being secured to the external surface, each said axial wall separating the instrumented area from a respective one of said non-instrumented areas, said instrumented area being located between said axial walls, and said instrumented area having an angular dimension smaller than an angular dimension of each of the non-instrumented areas.

2. The roller bearing according to claim 1, wherein the instrumented area includes a flat portion.

3. The roller bearing according to claim 1, wherein the instrumented area extends from the flange to an opposite edge of the external surface.

4. The roller bearing according to claim 1, wherein said attaching means are formed between the two axial walls in an angular portion delimiting the instrumented area.

5. The roller bearing according to claim 1, wherein the axial walls extend over an entire axial dimension of the external surface.

6. The roller bearing according to claim 1, further comprising a hole formed in a junction between the instrumented area and the flange.

7. The roller bearing assembly according to claim 1, wherein the means for structural relaxing one of said non-instrumented areas include a hole in a junction between said one non-instrumented area and the flange so as to detach, at least locally over an angular segment, the flange from the one non-instrumented area.

* * * * *